United States Patent [19]

Henry et al.

[11] Patent Number: 5,841,357
[45] Date of Patent: Nov. 24, 1998

[54] BATTERY ELECTROLYTE MONITOR

[75] Inventors: Ricky Joe Henry; Ernest Gene Horne, both of Katy, Tex.

[73] Assignee: Stewart & Stevenson Services, Inc., Sealy, Tex.

[21] Appl. No.: 688,308

[22] Filed: Jul. 30, 1996

[51] Int. Cl.⁶ ................................................. G08B 21/00
[52] U.S. Cl. ......................... 340/636; 340/620; 324/433; 429/93
[58] Field of Search .................................... 340/618, 620, 340/636, 455; 73/304 R; 324/432, 433; 429/91–93

[56] References Cited

U.S. PATENT DOCUMENTS

| | | | |
|---|---|---|---|
| 2,534,633 | 12/1950 | Smith | 177/311 |
| 3,600,234 | 8/1971 | Massie, Jr. | 136/182 |
| 3,891,465 | 6/1975 | Muto et al. | 136/182 |
| 3,994,175 | 11/1976 | Yamaguchi et al. | 73/453 |
| 3,996,579 | 12/1976 | Dahl | 340/636 |
| 4,053,686 | 10/1977 | Oxenreider | 429/91 |
| 4,217,645 | 8/1980 | Barry et al. | 364/483 |
| 4,284,951 | 8/1981 | Dahl et al. | 73/304 R |
| 4,329,406 | 5/1982 | Dahl et al. | 429/92 |
| 4,350,746 | 9/1982 | Chambers | 429/178 |
| 4,388,584 | 6/1983 | Dahl et al. | 320/48 |
| 4,625,201 | 11/1986 | Berry | 340/636 |
| 4,866,428 | 9/1989 | Hinkle | 340/636 |
| 4,957,828 | 9/1990 | Garron | 429/92 |
| 4,978,592 | 12/1990 | Dattilo | 429/89 |
| 4,981,764 | 1/1991 | Dattilo | 429/50 |
| 5,281,919 | 1/1994 | Palanisamy | 324/427 |
| 5,550,474 | 8/1996 | Dahl | 429/92 |

FOREIGN PATENT DOCUMENTS 567098  3/1977  U.S.S.R. .................. 244/73

*Primary Examiner*—Daniel J. Wu
*Attorney, Agent, or Firm*—Conley, Rose & Tayon, PC

[57] ABSTRACT

A wet cell battery electrolyte level monitor monitors the electrolyte fluid level of individual battery cells on battery powered mobile or stationary equipment. The one piece monitor includes a probe housing with associated circuitry and two wire leads. The monitor wire leads may be permanently or temporarily attached to the battery system voltage and battery system ground. After removing the battery fill cap of a specific cell, the probe is inserted into the fill cap opening on the battery. The monitor's electrolyte level indicator provides an indication that the electrolyte is at the battery manufacturer's recommended level. If the indicator does not illuminate, water needs to be added to the batteries.

1 Claim, 3 Drawing Sheets

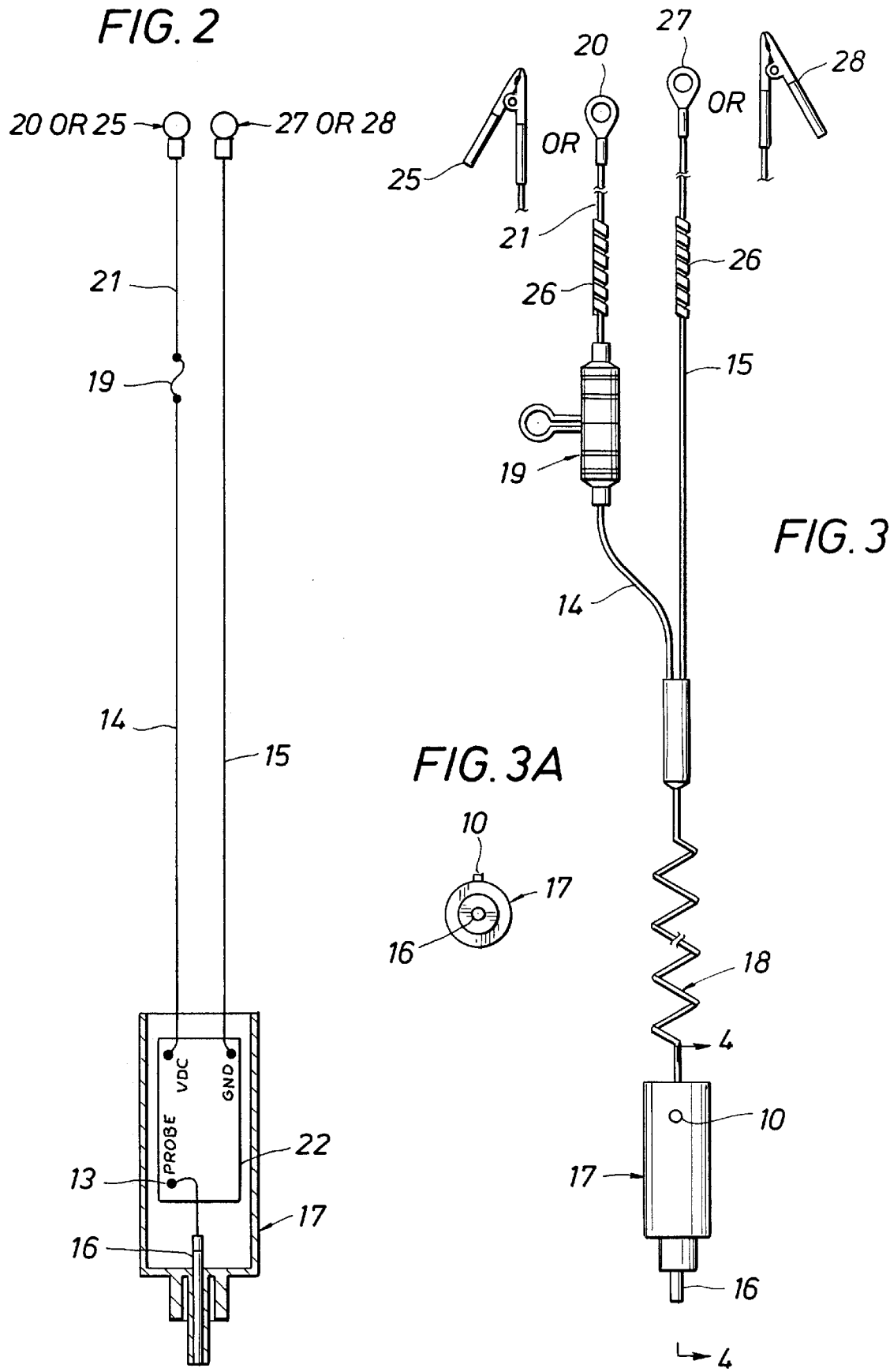

BATTERY ELECTROLYTE MONITOR

BACKGROUND OF THE INVENTION

1. Field of the Invention

The present invention relates to a novel improvement in battery monitors by which individual cells in a wet cell battery may be monitored for variations in electrolyte level and more specifically, relates to a universal electrolyte level monitor which is portable and is not permanently attached to the cells of a wet cell battery.

2. Description of Prior Art

It is well recognized that a wet cell battery's electrolyte level must cover the plates in each cell. It is also well recognized that as a battery is charged at the battery manufacturer's recommended voltage, some of the electrolyte in the battery cells begins to evaporate into a gas. Most of the gas condenses back into a liquid state within the battery cell, but some of this gas escapes through the battery cell's vented cap. When the battery electrolyte has evaporated to the point that the level has dropped below the top of the battery internal plates, reduced battery capacity and internal battery damage occurs. Thus it is important to monitor the battery electrolyte level.

The batteries in mobile equipment are typically not removed for inspection of electrolyte levels. It is not uncommon to find batteries in inaccessible locations difficult to remove without tools. Conventional techniques for monitoring the battery cell electrolyte level include visual inspection, visual hydrometers, and remote electronic monitoring. There is not always head room for a visual inspection of cells and often light levels are too low to inspect visual hydrometers. Remote electronic systems are permanently mounted and require a probe in each battery cell that typically replaces the fill cap, a remote mounted indicator, and wiring running from each probe to the indicator.

The prior art is replete with systems that indicate the electrolyte level within one or more cells of a wet cell battery. For example, U.S. Pat. No. 2,471,660; 2,534,633; 2,779,015; 3,891,465; 4,913,987; 4,978,592; 4,981,764; and USSR Patent Number SU-567-098 describe systems for indicating battery electrolyte level using probes which are inserted into one or more cells. When the electrolyte drops below a minimum acceptable level, a warning device of some sort is activated.

U.S. Pat. No. 2,471,660 requires that the battery be redesigned to accept the permanently mounted two wire electrodes. The electrodes are not installed in place of the battery fill cap. This permanently mounted monitor sends a signal to an external meter or light when the electrolyte is below a minimum acceptable level (below the electrode). An external switch is provided to switch from monitoring one cell to another.

U.S. Pat. No. 2,534,633 requires that each battery fill cap be replaced with a cap and a single wire electrode installed in each battery cell. Whenever the ignition switch is turned on and the electrolyte is above the minimum acceptable level (above the tip of the electrode), the electrode next to the battery negative terminal provides a ground which energizes a relay coil which in turn closes its contact to provide a ground to the relay coil that is attached to the next electrode. That electrode provides a positive voltage signal to energize the relay coil which closes its contact to provide a ground to the relay coil that is attached to the last electrode. That electrode provides a positive voltage signal to energize the relay coil which closes its contacts, providing a ground to the battery electrolyte indicator, illuminating the indicator. If the battery electrolyte level in any cell falls below the minimum acceptable level (below the electrode), the battery electrolyte level indicator will go out. Whenever the generator starts charging, once the vehicle is started, the battery electrolyte level monitoring circuitry is disabled.

U. S. Pat. No. 2,779,015 requires that a battery fill cap be replaced with a cap with a single wire electrode installed in the battery cell. Whenever the vehicle's starter switch or brake pedal is pressed and the battery electrolyte is below the minimum acceptable level (below the electrode), the circuitry momentarily flashes an indicator until a condenser is fully charged. When the electrolyte is above the minimum acceptable level, the electrode prevents the charging of the condenser, keeping the indicator off.

U.S. Pat. No. 3,891,465 requires that a battery fill cap be replaced with a cap and a single wire electrode installed in the battery cell. Whenever the battery electrolyte is below an acceptable level (below the electrode), a transistor is turned on, causing an indicator to illuminate. This method requires different transistor circuit designs to monitor different cells, due to the different voltage potentials of each cell. One transistor circuit design will not monitor all cells.

U.S. Pat. No. 4,913,987 requires that a battery fill cap be replaced with a cap and a single wire, battery cap sensor probe installed. The externally mounted circuitry (comprising the second part of the two part system) monitors the voltage of the probe when immersed in electrolyte. When the probe voltage drops below 2.25 volts (which occurs whenever the battery electrolyte is below an acceptable level (below the probe)), the externally mounted monitor flashes an LED. Placement of the probe in the proper cell is critical to ensure that the electrolyte voltage exceeds 2.25 volts. This circuitry will not function properly in cells with electrolyte voltage less than 2.25 volts.

U.S. Pat. No. 4,978,592 requires that a battery fill cap be replaced with a cap and a single wire, battery cap sensor probe installed. The battery cap sensor probe is of a two piece construction. The probe is hollow and has a vent to allow battery cell gases to escape. This patent is for a probe and not the external circuitry required to monitor battery electrolyte level.

U.S. Pat. No. 4,981,764 requires that a battery fill cap be replaced with a cap and a single wire, battery cap sensor probe installed. The externally mounted circuitry (comprising the second part of the two part system) monitors the voltage of the probe when immersed in electrolyte. When the probe voltage drops below 2.25 volts (which occurs whenever the battery electrolyte is below an acceptable level (below the probe)), the externally mounted monitor flashes an LED. Placement of the probe in the proper cell is critical to ensure that the electrolyte voltage exceeds 2.25 volts. As per the patent, this circuitry will not function properly in battery cells with electrolyte voltage less than 2.25 volts.

U.S.S.R. Patent SU-567-098 requires a single wire sensor that is inserted into the battery electrolyte at a predetermined level. Sensor design and method of insertion is not defined. The sensor provides a signal to two LEDs. Whenever the battery electrolyte is below an acceptable level (below the sensor), the low electrolyte level LED illuminates. Whenever the battery electrolyte level is above the minimum acceptable level, the electrolyte level present LED illuminates. The placement of the sensor in the proper cell is critical as LEDs have a typical minimum voltage requirement of 2.0 volts.

The prior art is likewise replete with systems that indicate specific gravity and/or cell temperature or other cell parameters, in addition to indicating the electrolyte level. For example, U.S. Pat. Nos. 3,600,234; 3,994,175; 3,996,579; 4,217,645; 4,329,406; 4,388,584; 4,625,201; 4,866,428; 4,957,828; and 5,281,919 all describe systems for indicating battery electrolyte level using probes which are inserted into one or more cells. When the electrolyte has dropped below a minimum acceptable level, a warning device of some sort is activated.

U.S. Pat. No. 3,600,234 requires a single wire probe that is inserted into the battery electrolyte at a predetermined level. Probe design and method of insertion is not designed. Whenever the battery electrolyte is below an acceptable level (below the probe), a transistor is turned on, causing a lamp to illuminate. This circuitry will not function properly in the battery cell(s) closest to the battery positive terminal.

U.S. Pat. No. 3,994,175 consists of a two part monitor. The first part consists of a sensor that is inserted into the battery cell. The sensor consists of a float, phototransistor, and detector circuitry. The second part consists of a external transistor based circuitry that converts the signal from the detector circuitry to an alarm output, when the electrolyte is below the minimum acceptable level.

U.S. Pat. No. 3,996,579 requires either a one or two wire probe that is inserted into each battery cell at a predetermined level. Probe design and method of insertion is not described. The two wire probes in each cell are connected by external resistors and illuminate a LED when battery electrolyte is above a minimum acceptable level in all cells. Whenever any of the battery cells electrolyte is below an acceptable level, the LED is turned off. The one wire probe design functions similarly to the two wire design. Some of the one wire probes are connected to the base of a transistor. Presence of electrolyte turns the transistor on. When all transistors are turned on, a signal is provided to an indicator. The lamp does not identify which cell has low electrolyte level. Both the one and two wire probe circuitry designs require a different wiring configuration for each cell.

U.S. Pat. No. 4,217,645 describes a multi-piece monitor which consists of a multiple transponders (probes), one mounted in each cell, and a remote microprocessor based scanner/display. The probe provides an output to the scanner/display which varies according to the electrolyte level. The output from the sensor consists of pulses or with alternating current. When the battery electrolyte falls below an acceptable level, a electrolyte level fault LED illuminates on the scanner/display.

U.S. Pat. No. 4,329,406 requires that a battery fill cap be replaced with a battery cap sensor probe installed. The two sensors are on the probe that correspond to a minimum acceptable battery electrolyte level. When the electrolyte is below a minimum acceptable level, the low electrolyte level LED, located on top of the probe and on a remote read-out indicator, if equipped, illuminates.

U.S. Pat. No. 4,388,584 requires that a battery fill cap be replaced with a battery cap probe installed. The monitoring system consists of battery cap probe(s) mounted in each cell and a remote display unit, consisting of a display and controlling circuitry. A bad cell alarm circuitry and indicator is located on the top of each probe to provide indication of which cell is out of tolerance (such as electrolyte below acceptable level), since the remote display unit does not identify which cell is out of tolerance. The indicator can illuminate continuously or flash. The probes require the remote display unit to function.

U.S. Pat. No. 4,625,201 consists of a single piece, portable monitoring unit/probe which may be moved from battery cell to battery cell. The probe is inserted into the battery fill opening. The monitor contains a single tungsten wire that is inserted in the tip of the probe and sealed with silicon or another material not affected by battery acid. When the battery electrolyte is above the minimum acceptable level, the probe will apply the battery cell electrolyte voltage to energize a relay to keep the low level alarm, located on the probe, off. Whenever the battery electrolyte is below an acceptable level (below the probe), the low electrolyte level relay will deenergize, turning on a low level alarm. An output to an externally mounted alarm device is provided. The relay may not function properly in all cells of a battery system.

U.S. Pat. No. 4,866,428 consists of a hollow probe that houses a ball that floats within a track on the electrolyte. The battery fill cap is be replaced with a battery cap sensor probe installed. When the electrolyte is above the minimum acceptable level, a light source provides a signal to a light detector, indicating the electrolyte level is acceptable. When the electrolyte level drops below the acceptable level, the ball drops within the track to block the light signal from reaching the light detector. The signal from the light detector is sent to a remote multiplexing unit that displays each cell's electrolyte level condition. The probe length is adjustable for different battery electrolyte level minimum requirements.

U.S. Pat. No. 4,957,828 is called an emergency battery monitor. The monitor contains a single tungsten wire that is inserted in the tip of the probe at a predetermined level. Probe design and method of insertion is not defined. Whenever the battery electrolyte is below an acceptable level (below the probe), no voltage is present at the tip of the probe, causing the circuitry to illuminate an LED. An output to an externally mounted alarm device is provided.

U.S. Pat. No. 5,281,919 consists of a microprocessor based monitoring system that does not physically measure the battery cell electrolyte level. No battery electrolyte level probe is used. The low electrolyte level is determined by analyzing polarization and internal resistance, larger than a predetermined limit, and state of charge and capacity, above preset levels.

The prior art devices are deficient in that they are not portable and do not include a single piece electrolyte level sensing device that contains no moving parts. Further, the prior art does not teach a device which may be used in every battery cell of wet batteries and can be used in 12 or 24 volt direct current mobile equipment systems without any modifications in the monitor circuit components, battery design, or battery fill caps. Further, the prior art does not disclose over current protection. Further, the prior art does not reveal the unique construction of the probe and the associated monitoring circuitry.

The present invention overcomes the deficiencies of the prior art.

SUMMARY OF THE INVENTION

The battery monitor of the present invention monitors the electrolyte fluid level in individual cells of a wet cell battery. The monitor includes a conductive probe adapted for insertion into the battery cell to a depth corresponding with the minimum acceptable electrolyte fluid level. The monitor further includes electrical circuitry having two wire leads, one connected to the positive terminal of the battery and a second connected to a ground. The electrical circuitry also includes an operational amplifier connected to the probe for conducting current to an indicator, such as an LED, if the probe is conducting current to the amplifier due to the electrolyte fluid level being in contact with the probe. The intensity of the LED is independent of the probe voltage. Further, the probe is composed of an antimonial lead and is molded into a non-conductive acid resistant glass filled polypropylene housing. The electrical circuitry is both reverse polarity protected and over voltage protected. The circuitry and leads are also encapsulated in epoxy to form a waterproof, acid resistant covering. The present invention has the advantage of operating at temperatures down to –50° Fahrenheit and can be tested by merely touching the probe to the positive terminal of the battery. The present invention provides a simple, portable, reliable, low cost monitoring and warning device that could be used in all battery cells of 12 and 24 volt dc mobile equipment systems, in low light conditions.

An object of the present invention is a wet cell battery electrolyte level monitor that provides a reliable means to indicate the electrolyte fluid level. The monitor determines when the cell electrolyte voltage is at or above a minimum level, indicating presence of electrolyte on the probe, and when the electrolyte voltage falls below a minimum level, indicating an absence of electrolyte on the probe.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 2 is a wiring diagram of the present invention;

FIG. 3 illustrates the wet cell battery electrolyte level monitor of the present invention;

FIG. 3A is an end view of the monitor of FIG. 3;

DETAILED DESCRIPTION OF THE INVENTION AND DRAWINGS

Figure 1:
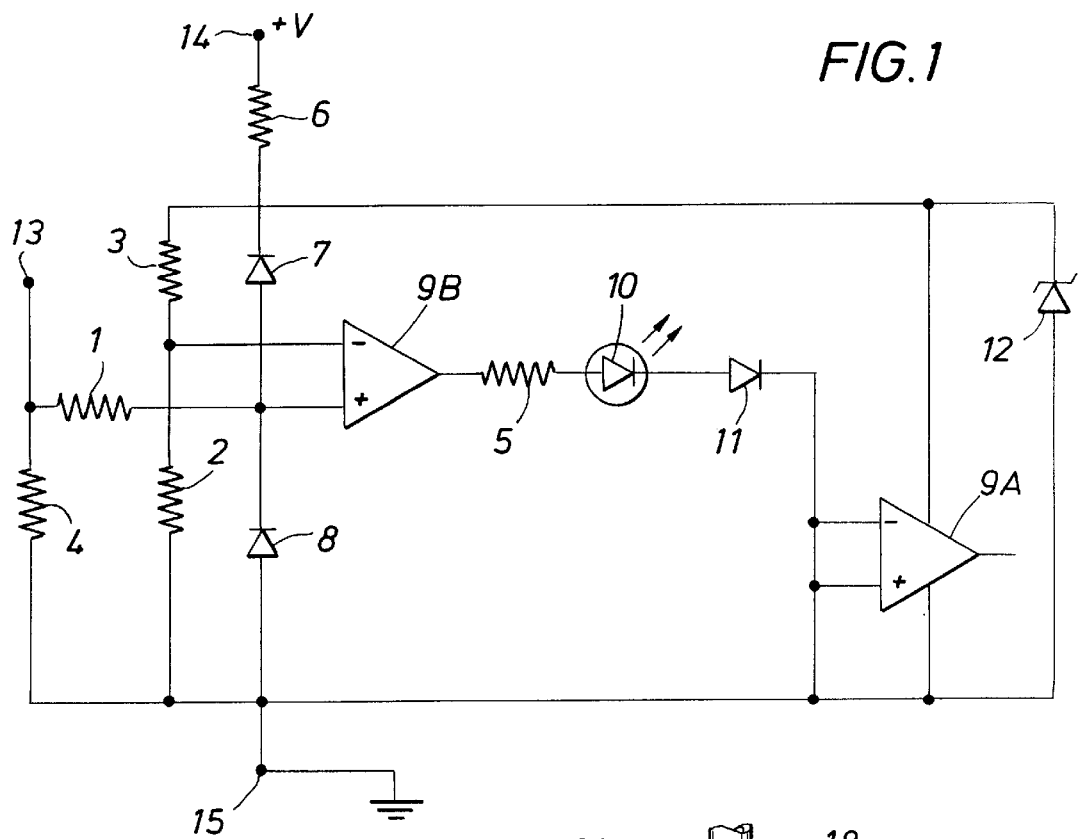
FIG. 1 shows a schematic diagram of the associated circuitry in the probe housing of a wet cell battery electrolyte level monitor of the present invention.

Referring initially to FIGS. 2 and 3, the wet cell battery electrolyte level monitor is shown in its fully assembled form in accordance with the preferred embodiment (FIG. 3), together with an electrical wiring diagram representation (FIG. 2). Probe 16 preferably is constructed of antimonial lead and connects electrically to printed circuit board 22. The probe 16 is molded into a nonconductive acid resistant glass-filled polypropylene probe housing 17. The length of the probe housing 17 is determined by the minimum acceptable electrolyte level in the battery cell of a specific group (size) of battery, as determined by the battery manufacturer. Preferably the probe housing 17 includes an electrolyte level LED 10. An acid-resistant coiled cable 18 protrudes from the end of probe housing 17 and encases wire leads 14, 15 that connects electrically to printed board assembly 22. The coiled cable 18 was implemented in the preferred embodiment to minimize cable length when the wet cell battery electrolyte level monitor is not in use.

The electrical wires preferably are designated as a positive wire 14 and a ground wire 15. The positive wire 14 preferably connects to a waterproof fuse holder containing a 0.25 amp over current protection fuse 19. Fuse 19 attaches to a positive lead 21, in close proximity to a connecting terminal. Positive lead 21 preferably attaches to ring terminal 20, wire clip 25, or any type of terminal suitable for the specific application. In use, ring terminal 20 or wire clip 25 connects to the battery system positive voltage terminal. This termination may be either 12 volts dc or 24 volts dc and is not necessarily located on the battery positive terminal. The ground wire 15 preferably attaches to ring terminal 27, wire clip 28, or any type of terminal suitable for the specific application. Ring terminal 27 or wire clip 28 connects to the battery system ground terminal. This termination is not necessarily located on the battery negative terminal. Both positive wire lead 21 and the ground wire 15 may be covered with a acid resistant, nonconductive protective covering 26, such as convoluted tubing, to minimize abrasion on the wire leads. Should the ground wire 15 and positive wire 14 become pinched together or the positive wire 14 become shorted to battery negative or ground, the low value of fuse 19 virtually eliminates any potential arcing at the pinch or point of short.

Figure 4:
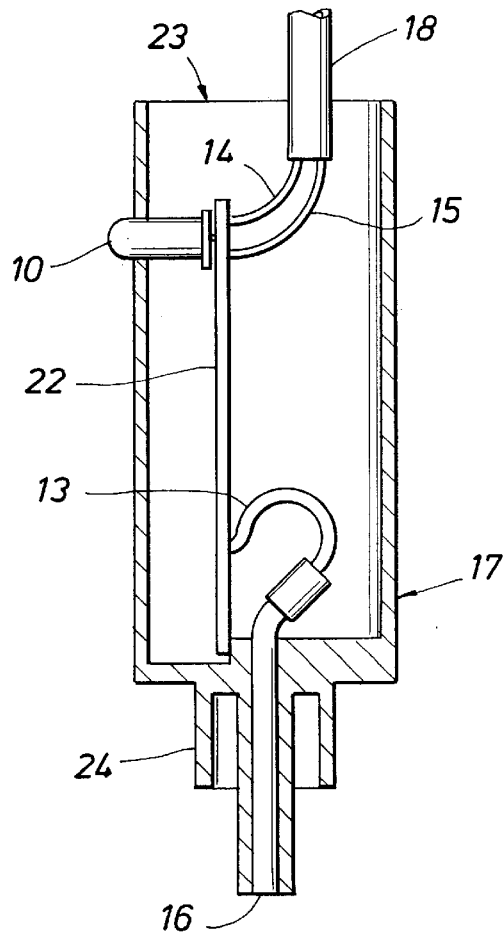
FIG. 4 is a detailed sectional view at plane A—A of the probe housing of the present invention shown in FIG. 3.

Referring now to FIG. 4, there is shown a detailed sectional view A—A of the probe housing 17 shown in FIG. 2. The sectional view shows the detail of the probe 16 molded into the nonconductive acid resistant glass filled polypropylene probe housing 17, effectively sealing the probe 16 to the probe housing surface. The molded tubular wall 24 of the probe housing 17 keeps the probe centered in the middle of the battery fill opening and also isolates probe 16 from the interior battery case sides. The isolation of the probe 16 from the battery case is important as a thin film of highly conductive battery electrolyte resides on all surfaces surrounding the battery fill opening. Without the tubular wall 24 and without the probe housing 17 covering all but the tip of the probe 16, the probe 16 could come in contact with the battery case sides of the battery fill opening and give an erroneous reading that the electrolyte is at the proper level when, in fact, the probe would be measuring the cell voltage present on the electrolyte film on the battery case.

The connection of probe 16 to the printed circuit board assembly 22 by means of probe wire 13 is also shown in FIG. 4. Protruding through the probe housing 17 is the electrolyte level LED indicator 10. The printed circuit board assembly 22 is attached to the positive wire 14 and ground wire 15 of coiled cable 18. The wires 13, 14, and 15 are connected to the circuit board assembly 22 by soldering. The inside of probe housing 17, along with the printed circuit board assembly 22 and the associated end of the coiled cable 18, is encapsulated (filled or potted) in an electronic grade epoxy 23 to form a waterproof, wet cell battery electrolyte level monitor. The epoxy 23 effectively insures that the printed circuit board assembly 22 and the attaching wiring 13, 14, and 15 are immune to the shock and vibration associated with mobile equipment. The epoxy 23 also provides strain relief to the solder connections where the wires 13, 14, and 15 attach to the printed circuit board assembly 22.

Referring now to FIG. 1, there is shown a schematic diagram of the printed circuit board assembly 22. A positive voltage source V+ connects to wire 14 to provide operating voltage to the circuit of FIG. 1. In the preferred embodiment, the positive terminal of a battery connects electrically to wire 14. The voltage potential V+ at wire 14 causes current to flow through a current limiting resistor 6. The cathode of a zener diode 12 connects to resistor 6 to clip the voltage to 20 volts dc. The anode of zener diode 12 connects to battery system ground via wire 15. The clipped positive voltage is applied to the positive voltage input of operational amplifier 9B. The clipped positive voltage also is applied across the voltage divider network comprising resistor 3 and resistor 2. Resistor 2 connects to battery system ground via wire 15. The node between resistors 3 and 2 provides a reference voltage at the inverting (−) input of operational amplifier 9B. The reference voltage setting, determined by the values of resistors 3 and 2, is below the minimum battery cell electrolyte voltage of the battery cell closest to the battery negative terminal (battery system ground).

As shown in the probe wiring diagram of FIG. 2, the probe 16 connects to wire 13, which, as shown in FIG. 1, connects to resistor 1 and resistor 4. Resistor 1 comprises a current limiting resistor that connects to the noninverting (+) input of the operational amplifier 9B. Whenever the probe housing 17 is inserted into a battery fill opening in the battery and the cell electrolyte is at or above the minimum acceptable level, the voltage charge of the cell electrolyte causes current to flow through probe 16 and current limiting resistor 1, generating a voltage potential at the noninverting (+) input of the operational amplifier 9B. The other terminal of resistor 4 connects to the battery system ground. The value of resistor 4 is selected to insure that a minimum current level is passed through the probe 16. Without resistor 4, the amount of current passing through resistor 1 may not be enough to overcome any resistance that may be on the surface of the probe 16.

Whenever the noninverting input voltage exceeds the inverting input voltage on operational amplifier 9B, the operational amplifier goes into saturation, providing a voltage output at resistor 5 approximately equal to the clipped positive voltage less 1.5 volts dc. Resistor 5 is provided to limit the current through electrolyte level LED 10 to less than 25 milliamps. Approximately 2.2 volts dc is dropped across the electrolyte level LED 10, causing the electrolyte level LED 10 to illuminate. The cathode of electrolyte level LED 10 connects to the anode of diode 11, and the cathode of diode 11 connects to ground. As described above, the electrolyte level LED 10 intensity (voltage) is independent of the probe 16 voltage (battery cell electrolyte voltage). The electrolyte level LED 10 is a high intensity red LED for maximum visibility in sunlight. Whenever the noninverting input voltage is less than the inverting input voltage on operational amplifier 9B, such as when battery cell electrolyte is below the minimum acceptable level, the operational amplifier 9B turns off, providing 0 volts dc at resistor 5. Diodes 7, 8, and 11 are provided to protect the operational amplifiers 9A and B from reverse polarity damage. Reverse polarity occurs when terminal 20 or 25, shown in the wiring diagram of FIG. 2, is connected to battery system ground and terminal 27 or 28 is connected to battery system positive voltage. Operational amplifier 9A is unused and its inverting (−) and noninverting (+) inputs are connected to ground.

Figure 5:
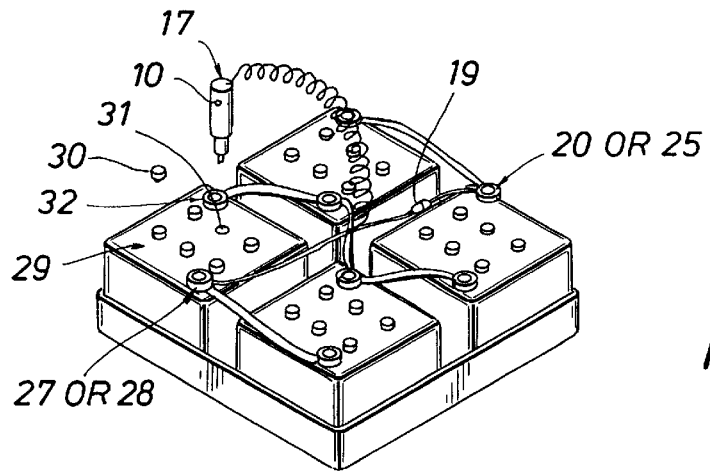
FIG. 5 illustrates the wet cell battery electrolyte level monitor of the present invention installed on a typical 24 volt battery system.

Referring now to FIG. 5, there is an illustration of the wet cell battery electrolyte level monitor installed in a typical 24 volt battery system. Ring terminal 20 or wire clip 25 is attached to the battery system +24 volt terminal. Ring terminal 27 or wire clip 28 is attached to the battery system ground terminal. The wet cell battery electrolyte level monitor's functionality is tested by touching probe 16 to the 12 volt battery positive terminal 32, which causes the electrolyte level LED 10 to illuminate. After removing the battery fill cap 30 from battery 29, the probe housing 17 is inserted into a battery cell fill opening 31 in the battery.

Figure 6A:
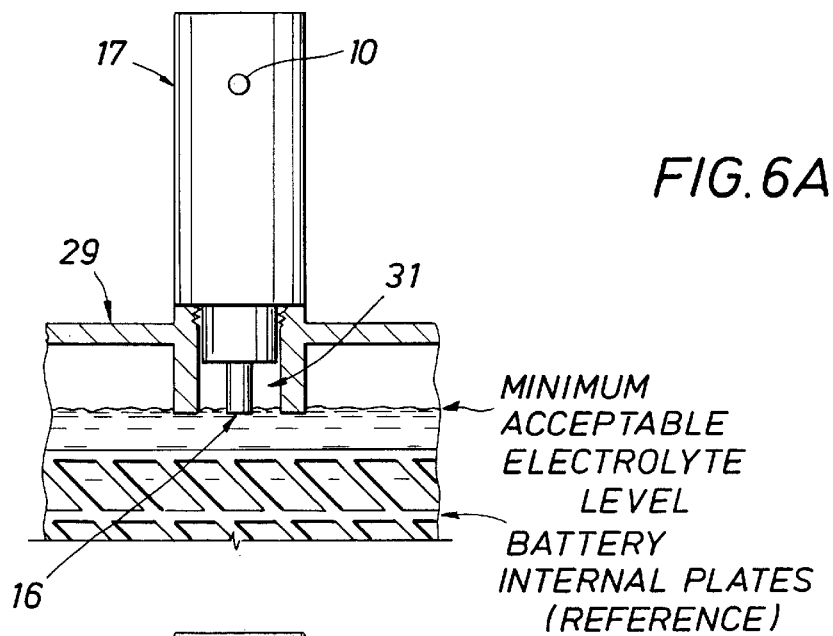
FIG. 6A is a cross sectional view of the wet cell battery electrolyte level monitor probe of the present invention inserted into a battery cell fill opening of a typical wet cell battery with a minimum acceptable electrolyte level.
Figure 6B:
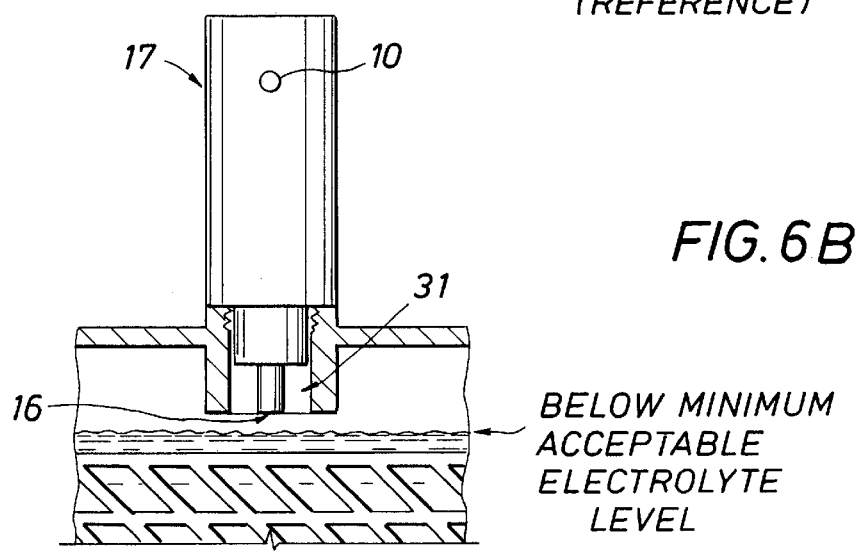
FIG. 6B is a cross sectional view of the wet cell battery electrolyte level monitor probe of the present invention inserted into a battery cell fill opening of a typical wet cell battery with the electrolyte being below the minimum acceptable electrolyte level.

Referring now to FIGS. 6A and 613, there is shown a cross sectional view of the wet cell battery electrolyte level monitor probe 16 inserted in a battery cell fill opening 31 of a typical wet cell battery 29. If the cell electrolyte is at or above the minimum acceptable level, probe 16 will be immersed in the electrolyte, and the electrolyte level LED 10 will illuminate as shown in FIG. 6A. If the cell electrolyte is below the minimum acceptable level, probe 16 will be above the electrolyte, and the electrolyte level LED 10 will not illuminate as shown in FIG. 6B.

It is understood that the detailed description of the present invention is intended to disclose an embodiment thereof to those skilled in the art who, having the benefit of such description, can readily devise other embodiments and modifications. Therefore, such other embodiments and modifications are to be considered to be within the scope and spirit of the invention.

What is claimed is:

1. A portable electrolyte fluid monitor for inserting into a fill opening in a wet cell battery, comprising:

a conductive probe composed of antimonial lead, adapted for insertion into the battery fill opening to a depth corresponding with a minimum acceptable electrolyte fluid level, said probe providing a variable voltage representative of the electrolyte voltage, wherein said probe is adapted for testing by touching said probe to a source of positive voltage;

a glass infused polypropylene housing that prevents said probe from contacting the battery case around the fill opening; and electrical circuitry coupled to said probe and disposed within said housing, said electrical circuitry comprising:

a first conductor enclosed in an acid resistant coiled cable;

a second conductor enclosed in an acid resistant coiled cable;

reverse polarity, over voltage, and over current protection circuitry; and an operational amplifier configured as a comparator for comparing said variable voltage to a reference voltage and delivering current to an LED if said input voltage exceeds said reference voltage.

* * * * *